(12) United States Patent
Waldman et al.

(10) Patent No.: US 10,373,393 B1
(45) Date of Patent: Aug. 6, 2019

(54) METHOD AND SYSTEM FOR IDENTIFICATION OF BEST FITTING FOOTWEAR

(71) Applicant: TRYFIT TECHNOLOGIES LTD., Dublin (IE)

(72) Inventors: Michael Waldman, Philadelphia, PA (US); Vagan Martirosyan, Sacramento, CA (US)

(73) Assignee: TryFit Technologies Ltd., Dublin (IE)

( * ) Notice: Subject to any disclaimer, the term of this patent is extended or adjusted under 35 U.S.C. 154(b) by 54 days.

(21) Appl. No.: 15/454,617

(22) Filed: Mar. 9, 2017

Related U.S. Application Data

(60) Provisional application No. 62/305,870, filed on Mar. 9, 2016.

(51) Int. Cl.
  *G06T 19/20* (2011.01)
  *A43D 1/02* (2006.01)
  *G06K 9/62* (2006.01)

(52) U.S. Cl.
  CPC ............ *G06T 19/20* (2013.01); *A43D 1/025* (2013.01); *G06K 9/6202* (2013.01); *G06T 2200/08* (2013.01); *G06T 2219/2021* (2013.01)

(58) Field of Classification Search
  None
  See application file for complete search history.

(56) References Cited

U.S. PATENT DOCUMENTS

| | | | | |
|---|---|---|---|---|
| 5,850,222 A | * | 12/1998 | Cone | G06T 17/20 345/418 |
| 2015/0089839 A1 | * | 4/2015 | James | A43B 11/00 36/102 |
| 2015/0130795 A1 | * | 5/2015 | Chhugani | G06T 19/20 345/419 |
| 2017/0249783 A1 | * | 8/2017 | Mach Shepherd | G06T 19/20 |
| 2017/0255185 A1 | * | 9/2017 | Hinshaw | A43B 1/00 |

* cited by examiner

*Primary Examiner* — Yi Wang
(74) *Attorney, Agent, or Firm* — Bardmesser Law Group

(57) ABSTRACT

A method for determining best fitting footwear includes acquiring a static 3D scan of a user's feet; generating a static 3D model of the user's feet; modifying the static 3D model to generate a dynamic 3D model that corresponds to changed shape of the user's feet when performing an athletic activity; identifying a footwear that best matches the dynamic model; and informing the user of the footwear that best matches the dynamic model. Optionally, the static 3D scan is retrieved from a database, or generated on the fly, or based on images from a mobile device. Optionally, the dynamic model takes into account a type of athletic activity, a weight distribution of the user, a load on the feet of the user, and a motion mechanism and strike type. Optionally, the dynamic model modifies a foot length, a foot width at ball, and a foot width at bottom.

18 Claims, 25 Drawing Sheets

CONVENTIONAL ART

CONVENTIONAL ART

METHOD AND SYSTEM FOR IDENTIFICATION OF BEST FITTING FOOTWEAR

CROSS REFERENCE TO RELATED APPLICATIONS

This application is a non-provisional of U.S. Provisional Patent Application No. 62/305,870, filed Mar. 9, 2016, incorporated herein by reference in its entirety.

BACKGROUND OF THE INVENTION

Field of the Invention

The present invention is related to a system and method for identifying a best fitting footwear taking into account both static and dynamic properties of the human foot, such as both when standing and running/moving.

Description of the Related Art

Human feet, when visualized in 3D, vary in length, width, height, shape, arch and effects of orthopedic problems. Ideally, everybody needs personalized, bespoke shoes. The bespoke shoe process uses sophisticated manual or digital foot measurement system to create fully customized lasts and shoes. The bespoke shoe process, shown in FIG. 1 utilizing 3D sizing, creates the best fitting footwear. However, bespoke shoes are expensive and slow to manufacture.

To make shoes affordable and readily available, manufacturers mass-produce 3D shoes as ready-to-wear footwear and size them to fit standard, idealized 3D feet in limited 2D length and width sizes. However, this traditional 2D Length and Width (L&W) sizing for 3D human feet and footwear is not capable of identifying dimensionally matching 3D feet and shoes without trying them on. The inability to identify matching shoes by their size creates several problems, see FIG. 2 (showing in-store and online shopping processes).

(a) Limited inventory, proximity and time dependent, trial & error time-consuming in-store shopping process. However, an ability to try the shoes on creates a high Fit Confidence and, as a result, a high (up to 67%) conversion rate and a low rate of returns.

(b) Extended inventory, proximity and time independent, rapid online shopping process. However, inability to try the shoes on drops the Fit Confidence sharply and, as a result, the Conversion rate falls to only 2% and increases the rate of Returns.

To increase fit confidence for online purchasing decisions, various developers offer solutions that recreate the functions of human foot-footwear trying-on process in 3D digital virtual fitting rooms. Such solutions place the digital 3D model of the shopper's foot into the digital 3D model of the shoe insides (see FIG. 3) and evaluate the pressure points in the foot-footwear static interaction.

However, a physical trying-on process is based on human pressure sensitivity, whereas virtual Trying On process recreates only geometry of the foot-shoe positioning. Intensity maps provide rather inaccurate qualitative visual foot-shoe positioning feedback, which gives the shopper poor fit confidence for online purchasing decisions.

Another sign of an evolutionary dead end of the trying-on process in both physical and virtual fitting rooms is an exponential growth of specialized shoes. The specialization of athletic (sneakers) shoes for specific activities has increased exponentially from only 5 models in 1970 to 285 models in 1998 and 3,371 models in 2012 (Aichner, T. and Coletti, P., *Customers' online shopping preferences in mass customization. Journal of Direct, Data and Digital Marketing Practice*, 15(1): 20-35, 2013) These shoes have different models, different 3D insides, and different lasts.

The physical trying-on process is not optimal for a Best Fitting Footwear Identification because it would take months to try on available shoes—NIKE alone, for example, sells about 140 different models of running shoes for men—and these are just running shoes. Mimicking human footwear trying-on process for computer-based Best Fitting Footwear Identification Process is also a dead end because of inaccuracy and time-consuming evaluation of the intensity maps.

Any known fitting methods match footwear with physical or digital 3D foot dimensions at standing static posture. This would be enough if people were always motionless—but people are active and their foot dimensions change significantly with activity, creating use dissatisfaction—according to some estimates, about 60% of people wear wrong-fitting footwear.

Wearing shoes creates dynamic activity-specific interactions with the environment and the feet. Dynamic activities change the weight distribution, load the foot and, as a result, change dynamically 3D dimensions of the foot creating collisions between the foot and the insides of the footwear. Therefore, the best dimensional matching shoe for static conditions of a fitting room might be an uncomfortable mismatch for the real purpose of the purchased shoes such as dynamic walking, running, hiking, skiing, and other activities. Used shoes cannot be returned. The shopper either must suffer physically and emotionally from wearing a wrong size shoe or must relegate the shoes to the back of the closet.

As an example, a consumer wears size 10 and buys a pair of running shoes size 10 because they fit well in a static sitting or standing postures in a store fitting room. But when running, for instance, when the foot hits the ground, it expands by about 15% in width and about half of an inch in length. The 3D shape and dimensions of the foot change as well. Every time the shoe hits the ground, the runner's foot becomes size 10.5-11 and collides with the shoe size 10 that the runner is wearing (see FIG. 4, which shows static fitting room fit vs. dynamic action fit.). Finding the best match between dynamically changing 3D shape and dimensions of the running foot and 3D insides of the running shoes models ideally requires test-running in all of them, which is obviously not possible for about 600 (as of today) models for running, and because used shoes cannot be returned.

The athletic footwear design optimizes footwear for dynamic athletic activities. However, the retail footwear identification processes ignore 3D shape and dimensions changes of the foot under these specific activities and their effect on 3D foot-footwear fit.

Accordingly, there is a need in the art for a system and method of enabling a user to select footwear that matches both static and dynamic characteristics of his feet, without having to try on the shoes physically.

SUMMARY OF THE INVENTION

The present invention is related to a method and system for identifying best fit footwear that substantially overcomes the disadvantages of the related art.

According to an exemplary embodiment, a method for determining best fitting footwear includes acquiring a static 3D scan of a user's feet in a static standing posture; generating a static 3D model of the user's feet; modifying the static 3D model to generate a dynamic 3D model that corresponds to changed shape of the user's feet when performing an athletic activity; identifying a footwear that best matches the dynamic 3D model; and informing the user of the footwear that best matches the dynamic 3D model.

Optionally, the static 3D scan is retrieved from a database. Optionally, the static 3D scan is generated on the fly. Optionally, the static 3D scan is generated based on images from a mobile device. Optionally, the dynamic 3D model takes into account a type of athletic activity. Optionally, the dynamic 3D model takes into account a weight distribution of the user. Optionally, the dynamic 3D model takes into account a load on the feet of the user. Optionally, the dynamic 3D model takes into account a motion mechanism and strike type. Optionally, the dynamic 3D model modifies a foot length, a foot width at ball of the foot, and a foot width at bottom of the foot. Optionally, the length is scaled according to $$\varphi'(x, y, z) = \varphi\left(x, \left(\frac{(y2 - y1)(x - x1)}{yb(x2 - x1)} + \frac{y1}{yb}\right) \cdot (y - yc) + yc, z\right),$$

where $$yb = \left[\frac{B - A}{2}\right]_y, \text{ and } yc = \left[\frac{B + A}{2}\right]_y.$$

Optionally, the static 3D model includes two characteristic ellipsoids, whose mutual position is used to define the locations of a toe, a heel and a shin. Optionally, the dynamic 3D model includes a maximum-deviation scan $$\sigma = \frac{L}{2}\sin\alpha,$$

where L is a maximum polygon size in any direction, a is the angle of maximum deviation between polygons of two skinned meshes. Optionally, the method includes applying soft-body deformations are applied to a mesh of the static 3D model, which reflect a flattening of the foot.

In another embodiment, a method for determining best fitting footwear includes acquiring a 3D scan of a user's feet in the static standing posture; generating a digital 3D model of the user's feet in the static standing posture; simulating a variety of the user's dynamic casual and athletic activities to identify the activity-specific 3D shape and dimensional changes of the user's feet in the static standing posture; generating the activity-optimized digital 3D model of the user's feet in static standing posture with 3D foot parameters defined and modified by the activity simulation, e.g. 3D "running" foot in standing posture; generating digital 3D shoe lasts for activity-specific retailer/brand footwear collection, e.g. digital 3D running shoes lasts; comparing parameters of identical 3D measurements between the activity-optimized 3D foot model and the retailer's (brand's) activity-specific shoe lasts or 3D insides of the shoe, e.g. comparing bespoke type 3D measurements; calculating FitRate, which quantifies the Fit using a combination of weighted comparison parameters; identifying the best fitting footwear that best matches the activity-optimized 3D model; and informing the user of the best fitting footwear for selected casual or athletic activity.

In another embodiment, a system for determining best fitting footwear includes a computing device configured to acquire a static 3D scan of a user's feet; the computing device configured to generate a static 3D model of the user's feet; the computing device configured to modify the static 3D model to generate a dynamic 3D model that corresponds to changed shape of the user's feet when performing an athletic activity; the computing device configured to identify a footwear that best matches the dynamic 3D model; and the computing device configured to inform the user of the footwear that best matches the dynamic 3D model.

In another embodiment, a method for determining best fitting footwear includes acquiring a 3D scan of the user's feet in a static standing posture; generating a digital 3D model of the user's feet in the static standing posture; generating a bespoke digital 3D shoe last for the digital 3D model; generating a bespoke activity-optimized digital 3D shoe last for the digital 3D model; generating digital 3D shoe lasts for a footwear collection; comparing the bespoke activity-optimized digital 3D shoe last and the digital 3D shoe lasts for the footwear collection to identify a closest match in the footwear collection; and informing the user of the closest match.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

Figure 1:
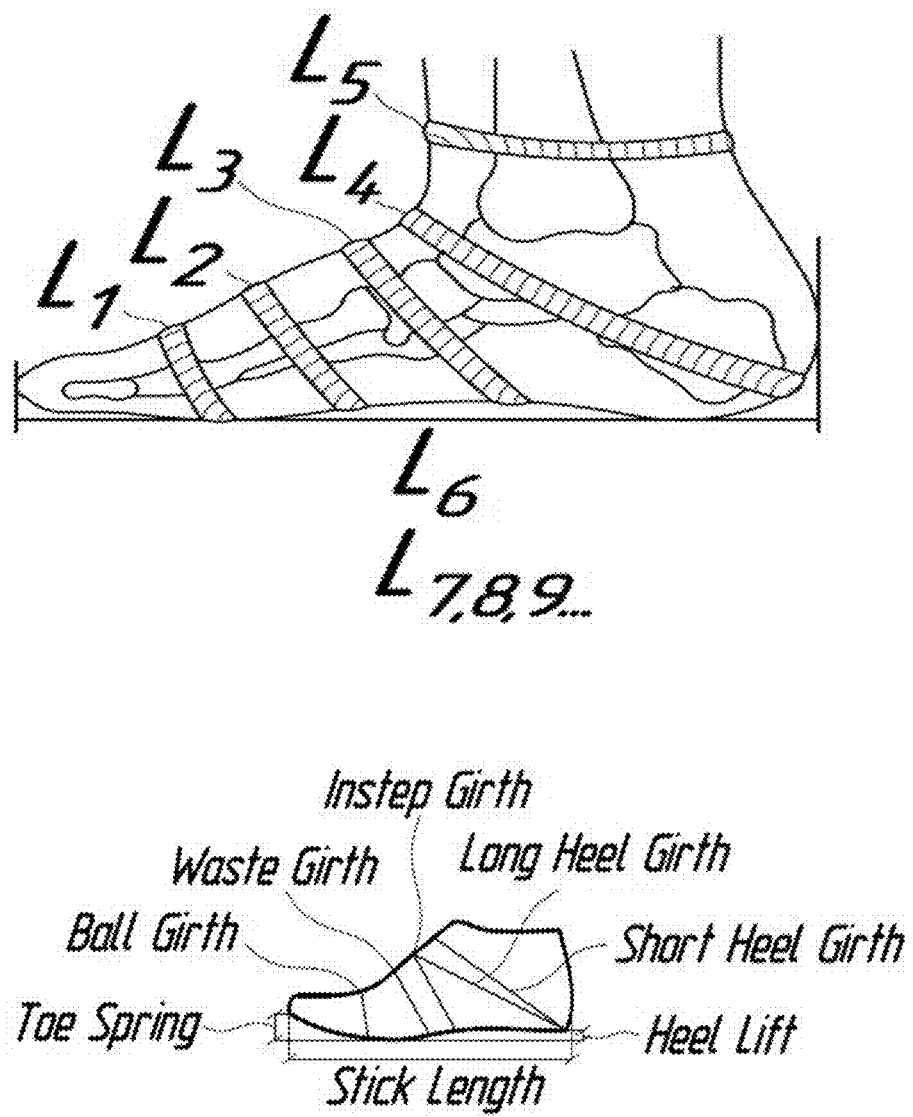
FIG. 1 shows the bespoke shoe process utilizing 3D measurements.
Figure 2:
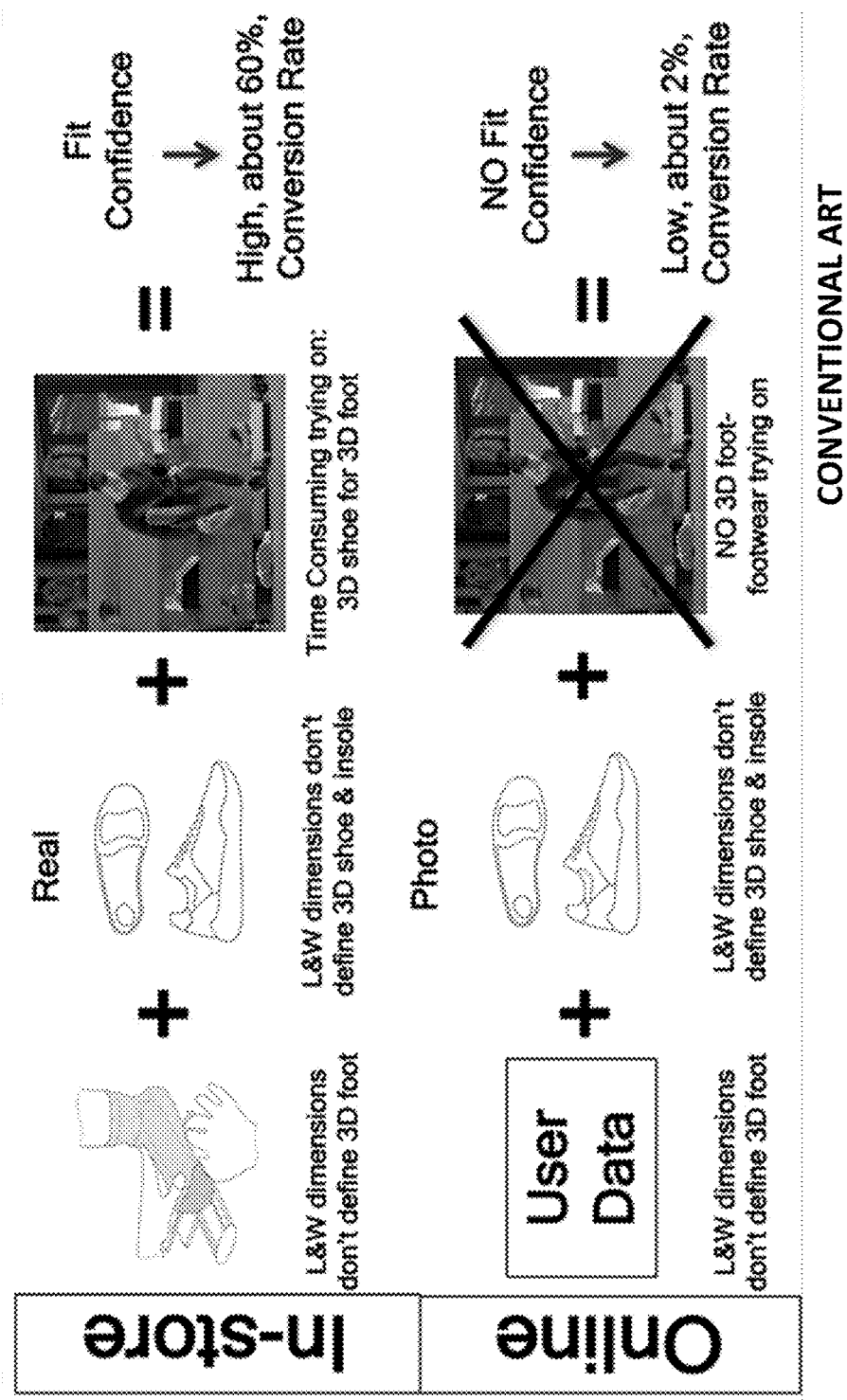
FIG. 2 shows in-store and online shoe shopping processes.
Figure 3:
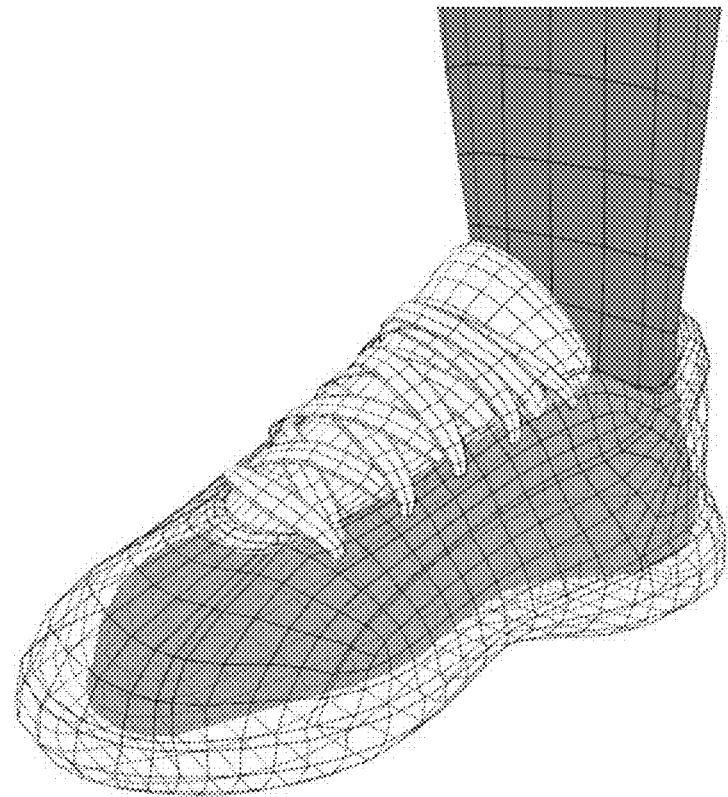
FIG. 3 shows fitting a digital 3D model of the shopper's foot into a digital 3D model of the shoe insides.
Figure 4:
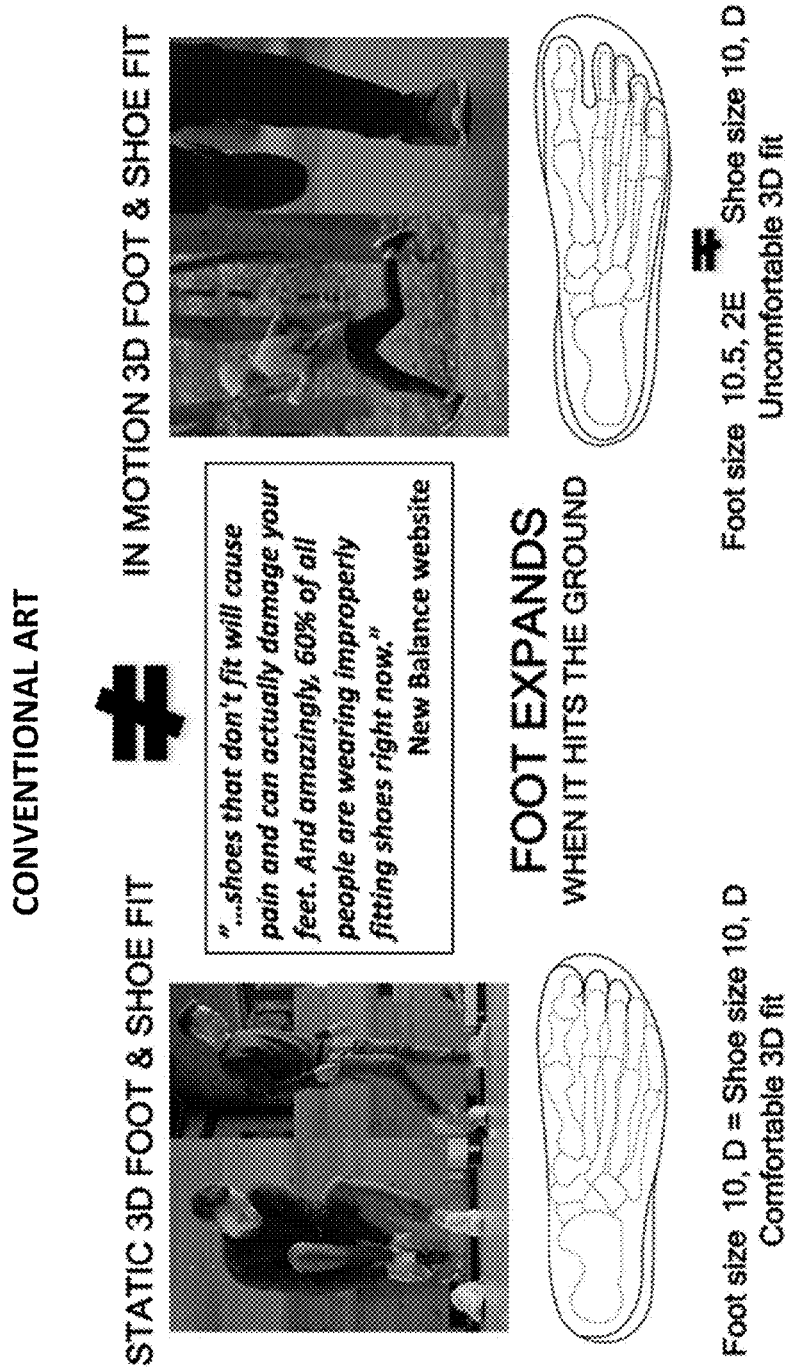
FIG. 4 shows static fitting room fit vs. dynamic action fit.
Figure 5A:
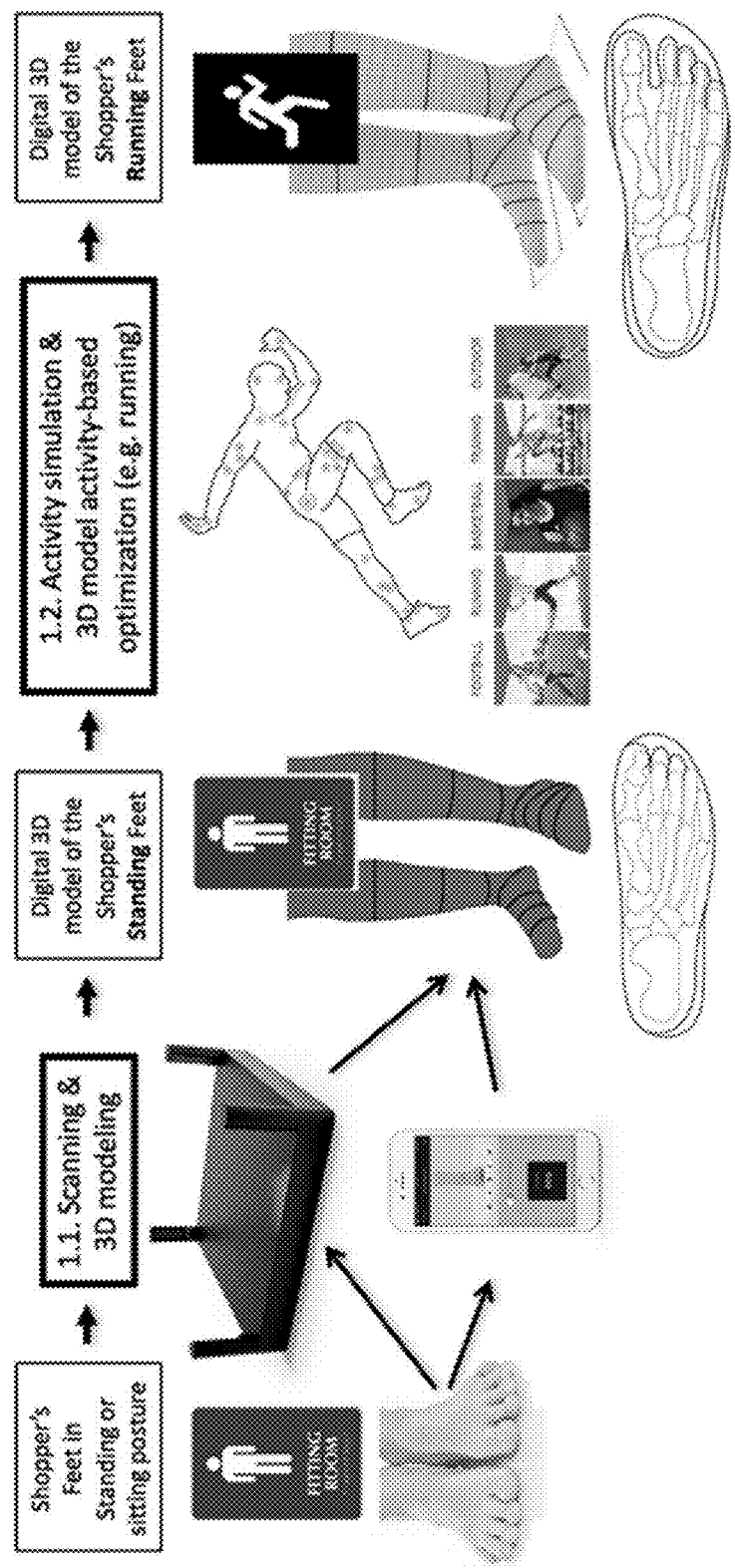
Figure 5B:
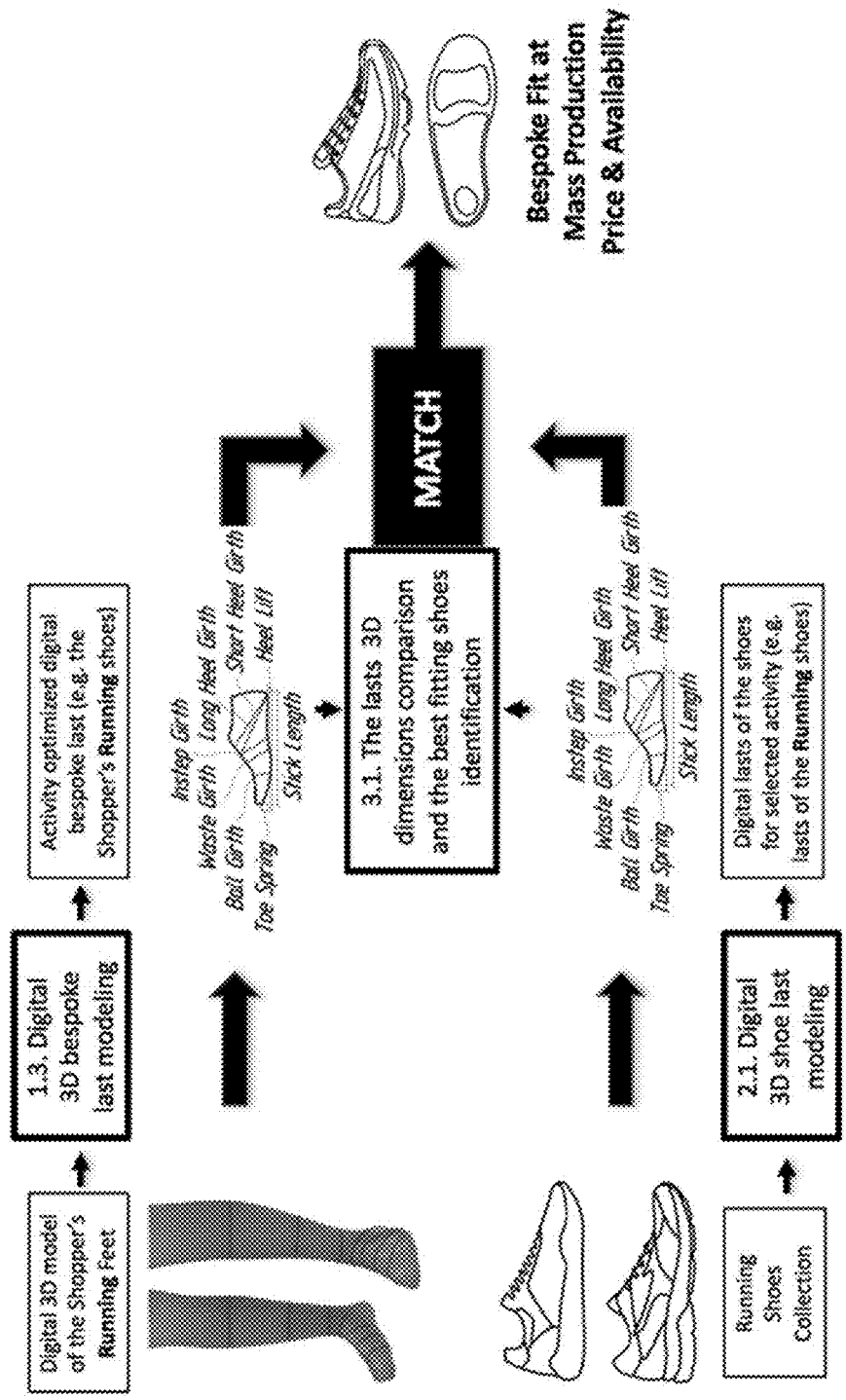

FIG. 5A and FIG. 5B, which should be viewed as a single figure, illustrate a process to automatically identify a bespoke level of fit optimized for a variety of shoe uses at mass production price and availability.

Figure 6:
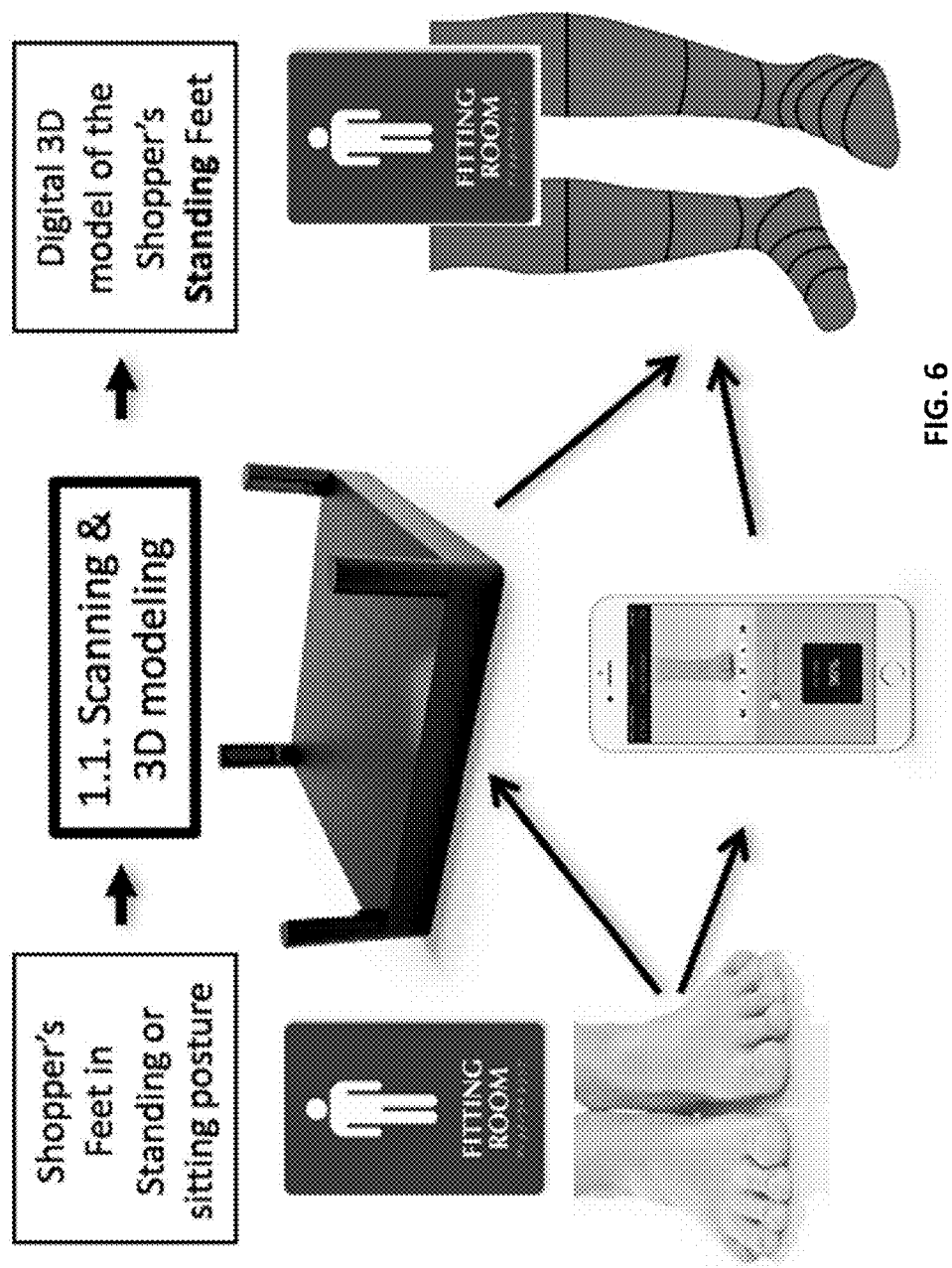

FIG. 6 shows activity simulation and activity-based optimization of 3D foot modeling.

Figure 7:
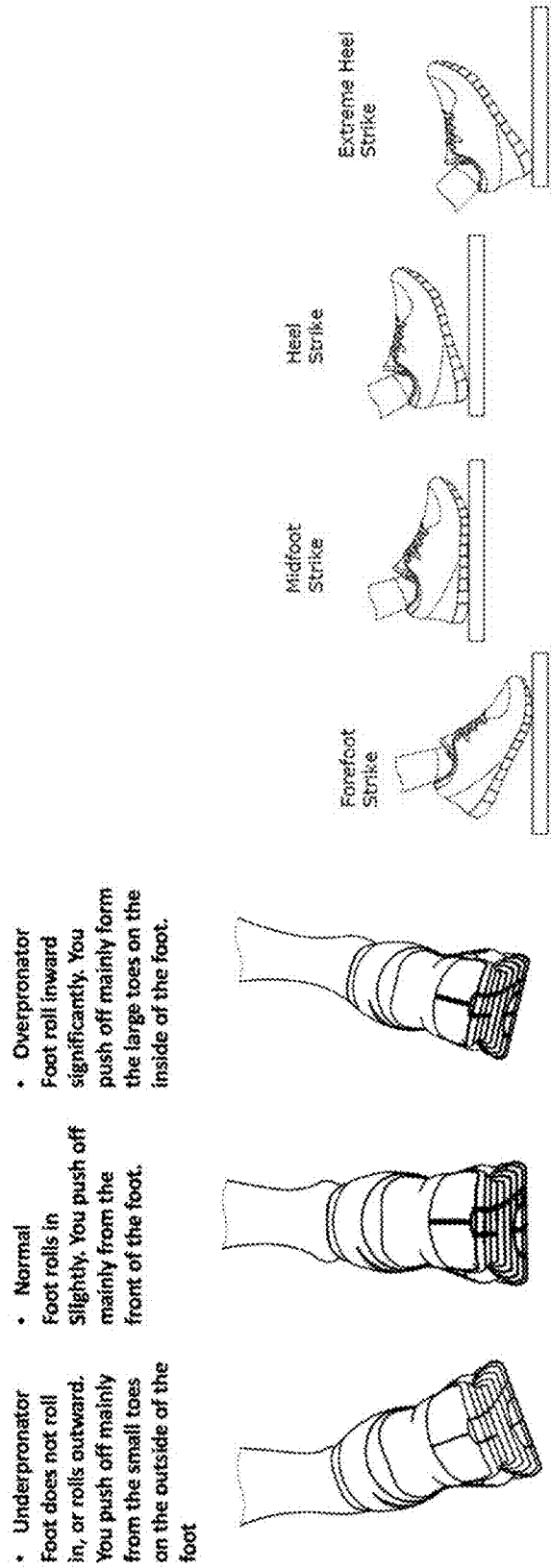

FIG. 7 shows a user's motion mechanisms and strike types

Figure 8:
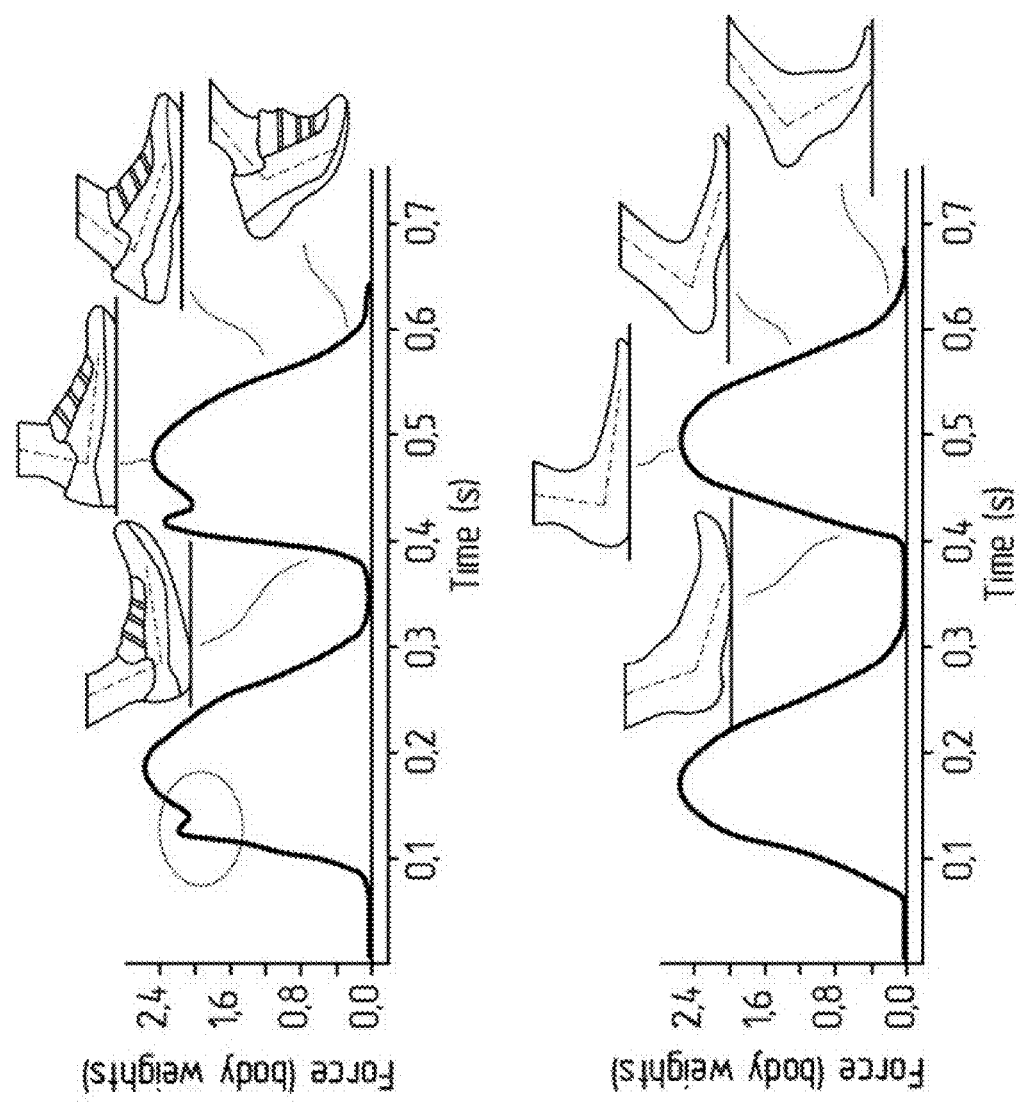

FIG. 8 illustrates representative stages of different running processes

Figure 9:
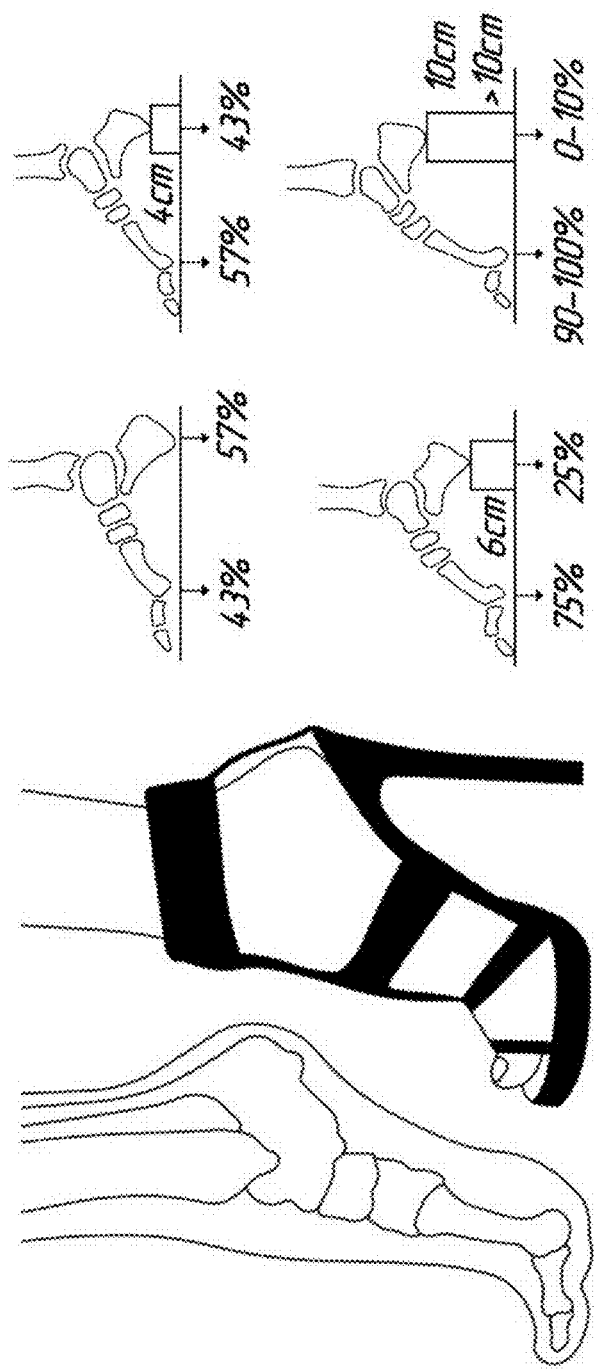

FIG. 9 illustrates high-heel weight distribution.

Figure 10:
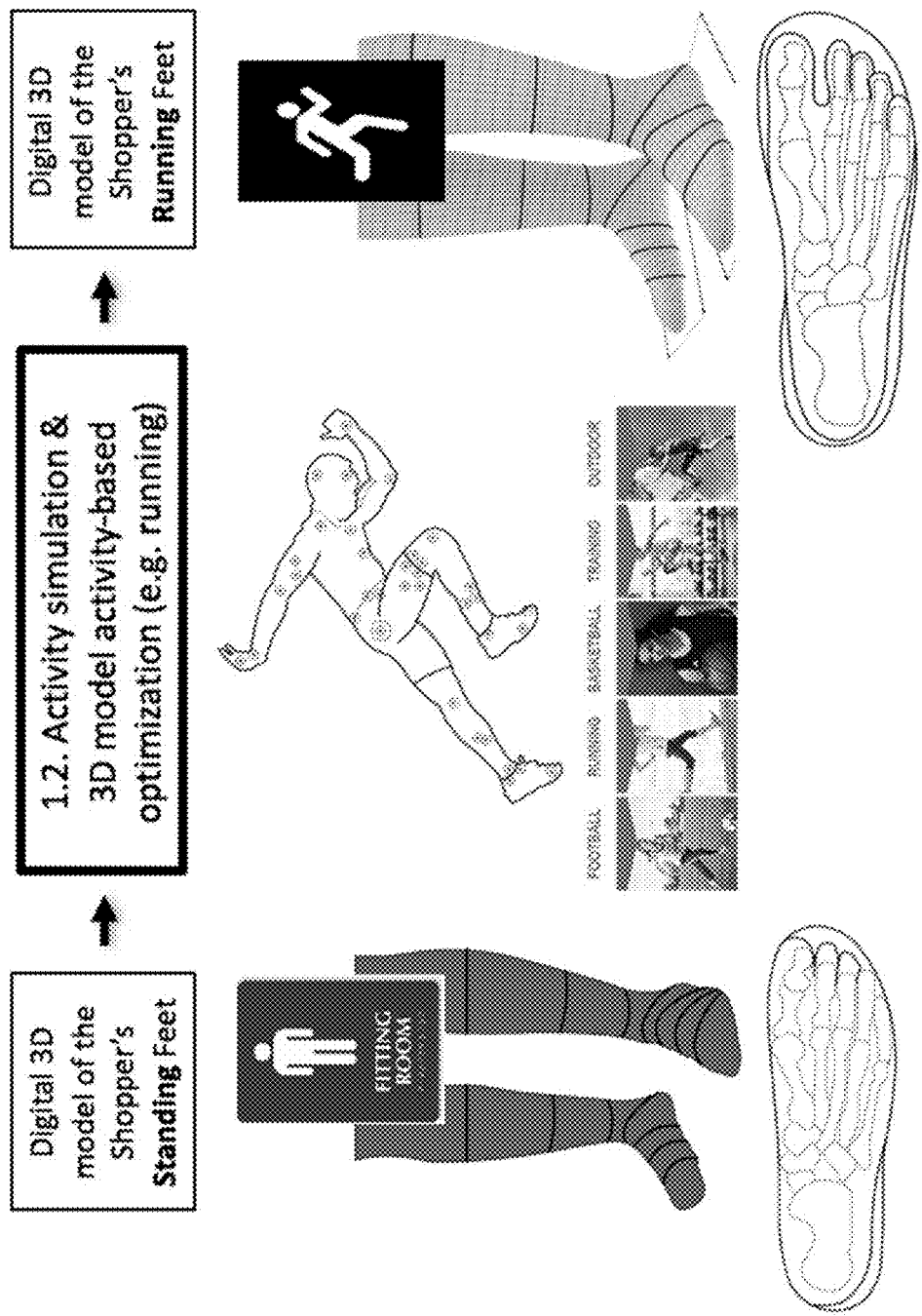

FIG. 10 illustrates a block diagram of step 1.2, showing activity simulation and activity-based optimization of 3D foot modeling.

Figure 11:
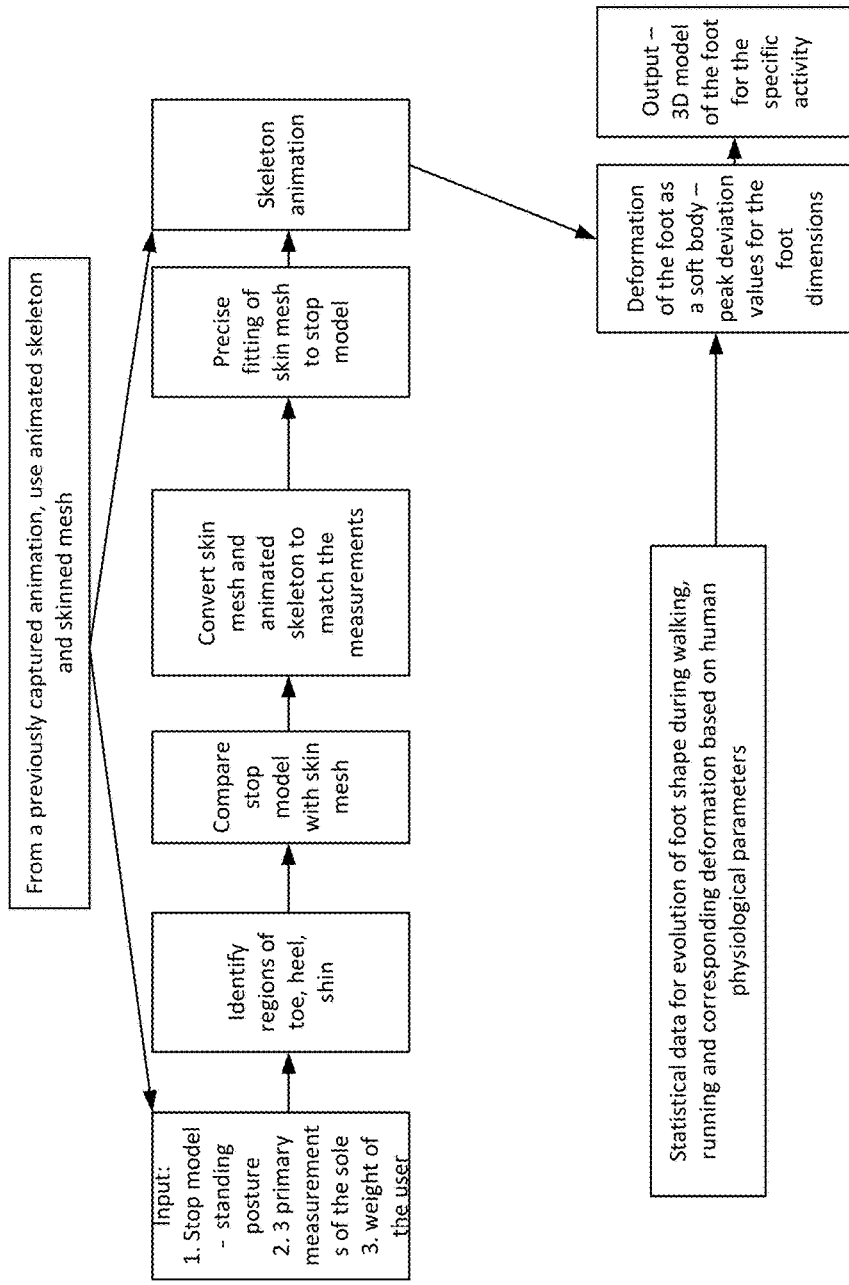

FIG. 11 illustrates activity simulation and activity-based optimization of 3D foot modeling.

Figure 12:
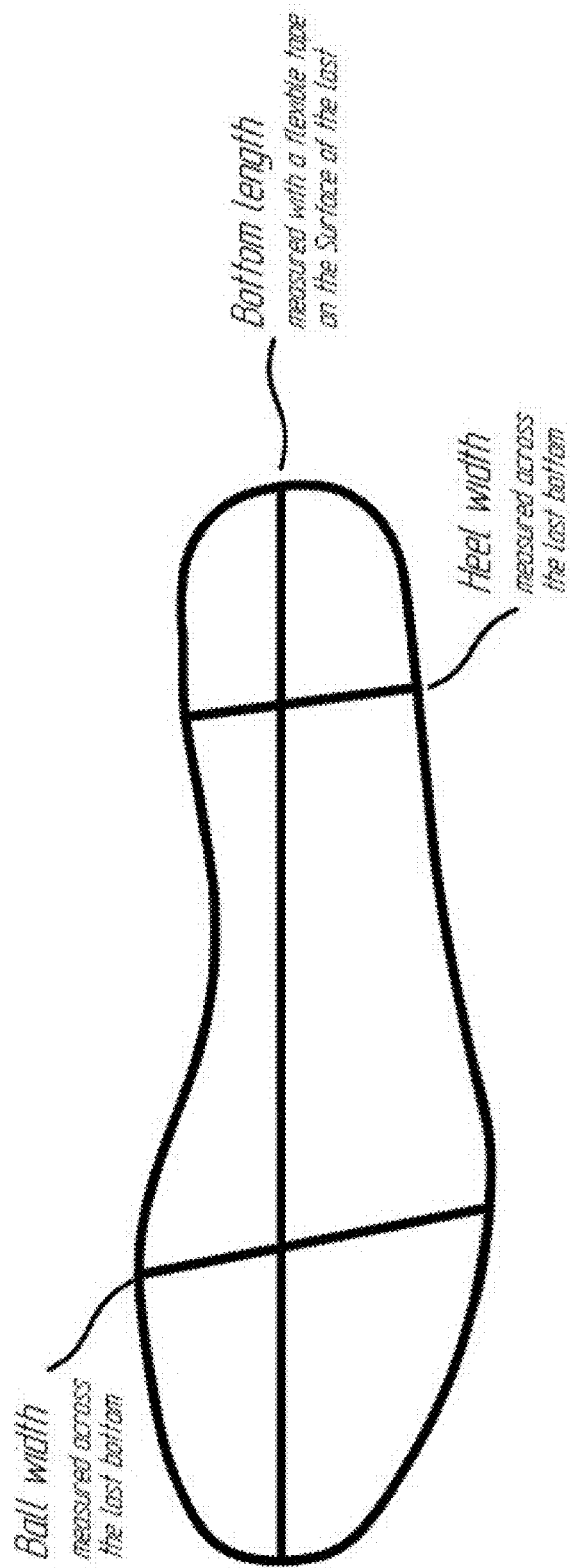

FIG. 12 shows the three primary measurements of a foot.

Figure 13:
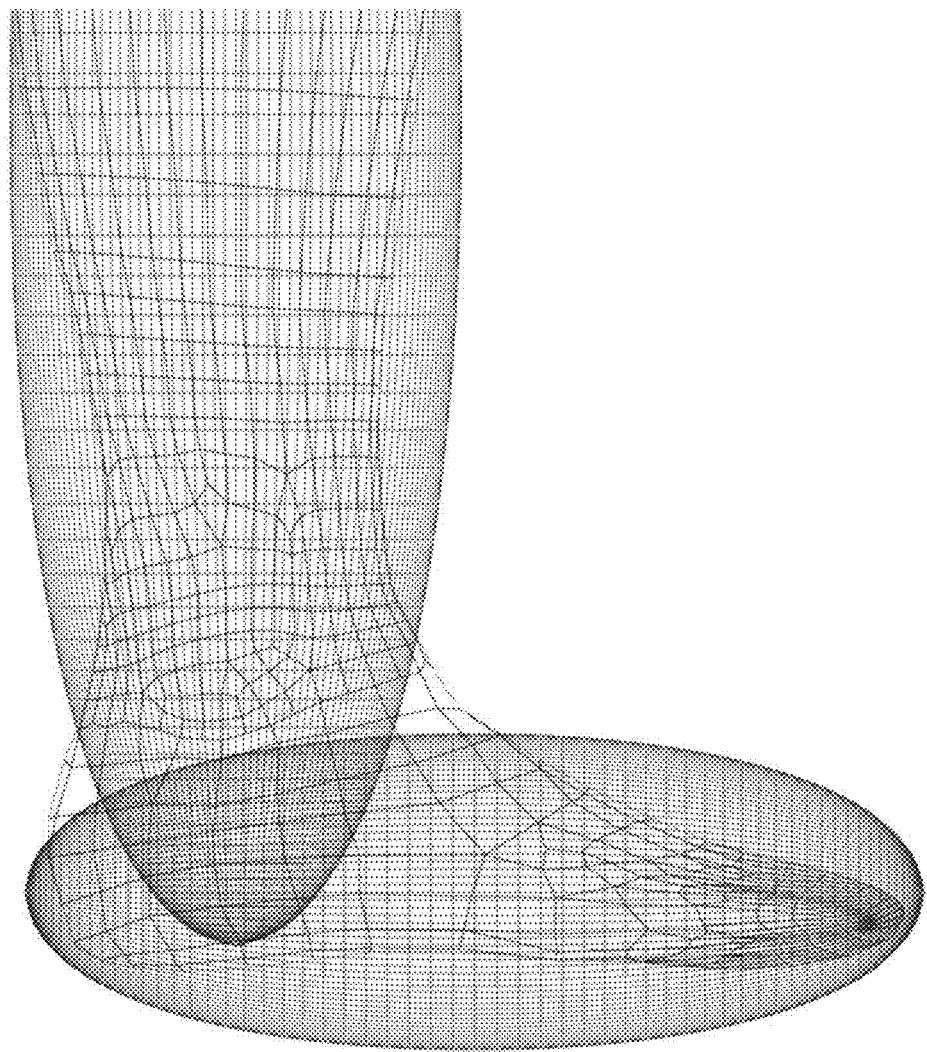

FIG. 13 shows two possibilities for the characteristic ellipsoids.

Figure 14:
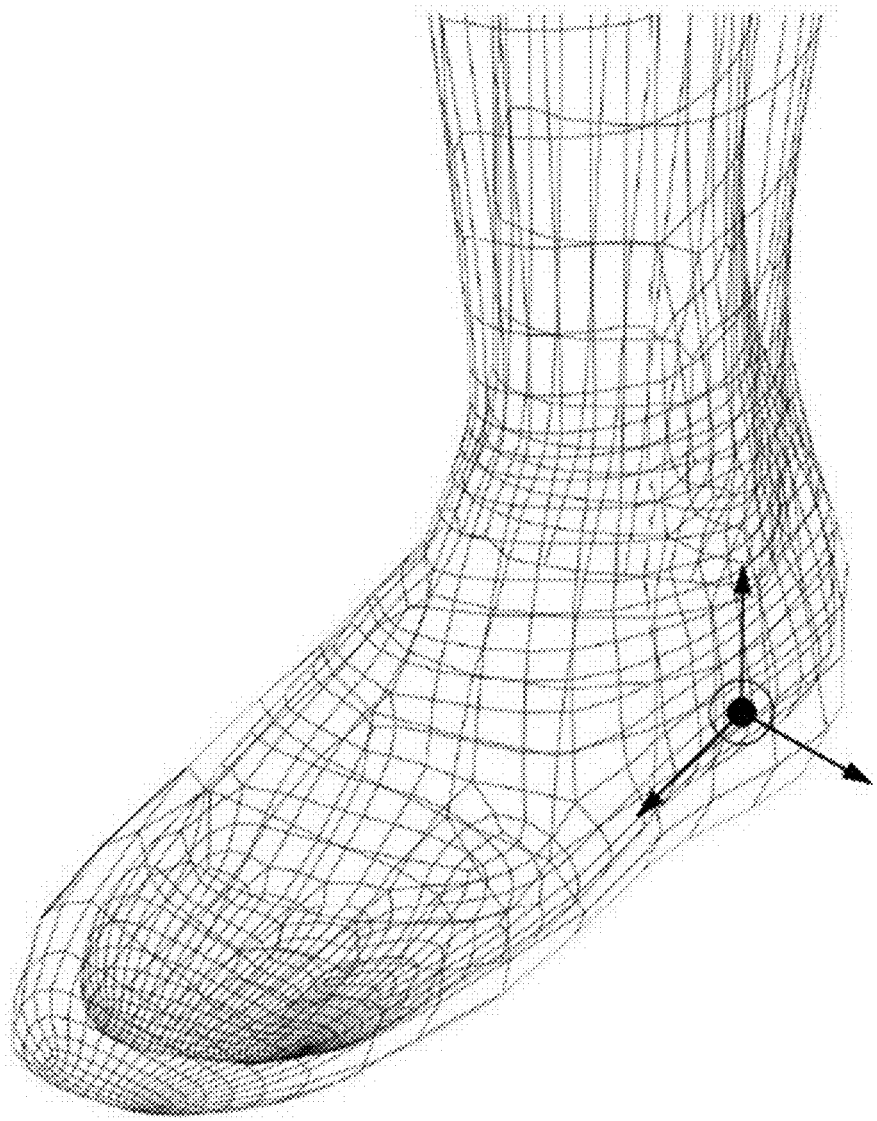

FIG. 14 shows how the scan of the foot is compared to the skinned mesh used in the animation.

Figure 15:
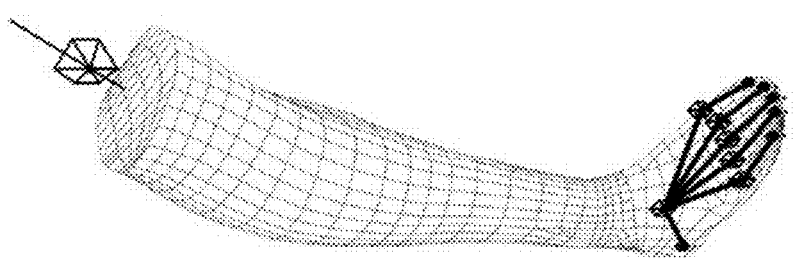
Figure 15:
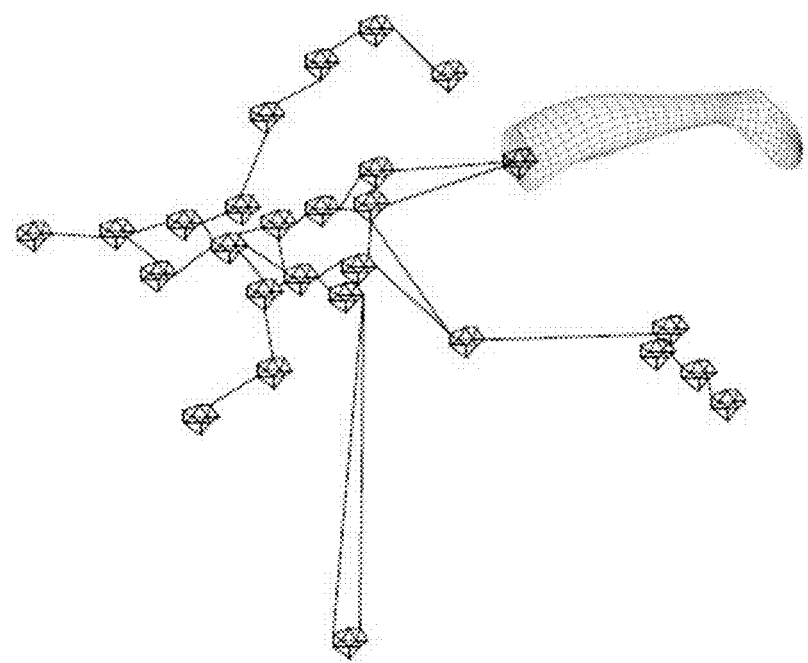

FIG. 15 shows an animated skeleton and skinned mesh.

Figure 16:
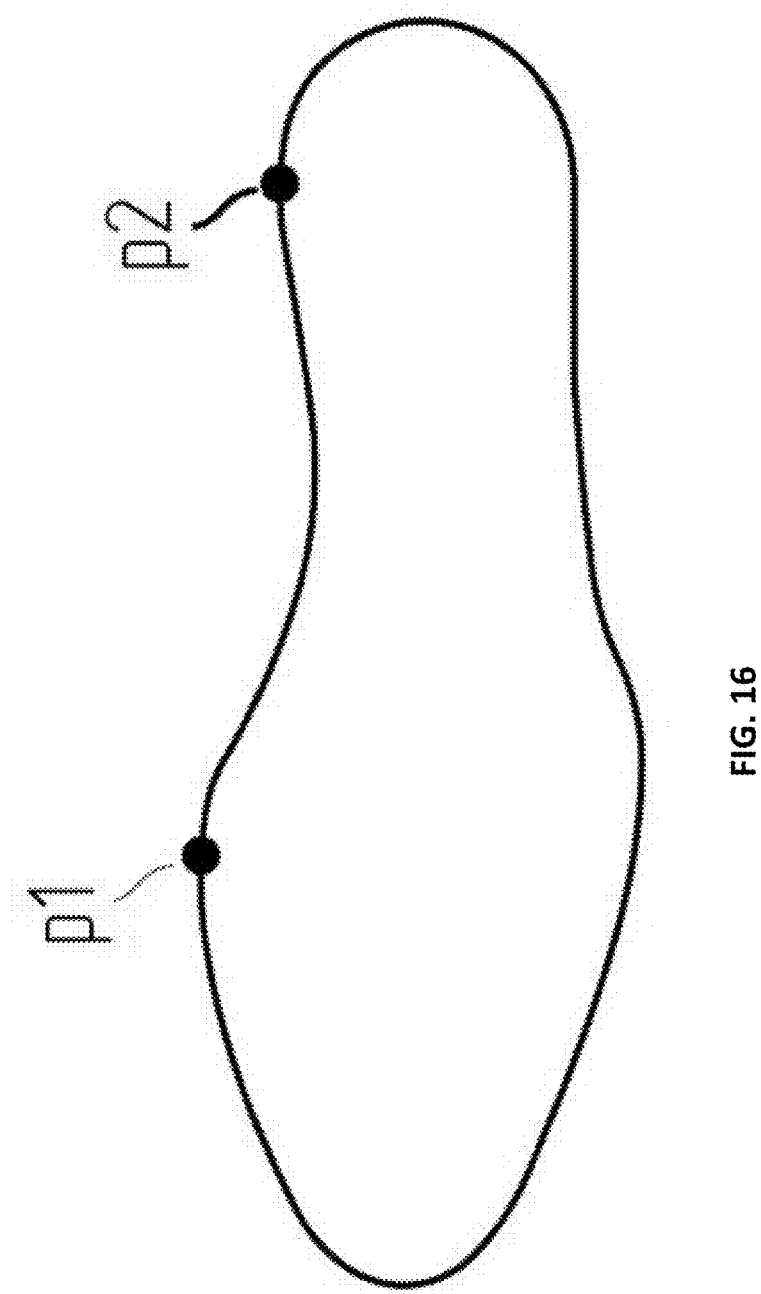

FIG. 16 shows the base points used in the transformation of the foot model.

FIGS. 17A-17D, show animation frames where positions of key points are monitored, soft-body deformations are applied to a mesh, which reflect a "squashing" or flattening of the foot during running, and pressure maps of foot impact against the ground are created.

Figure 18:
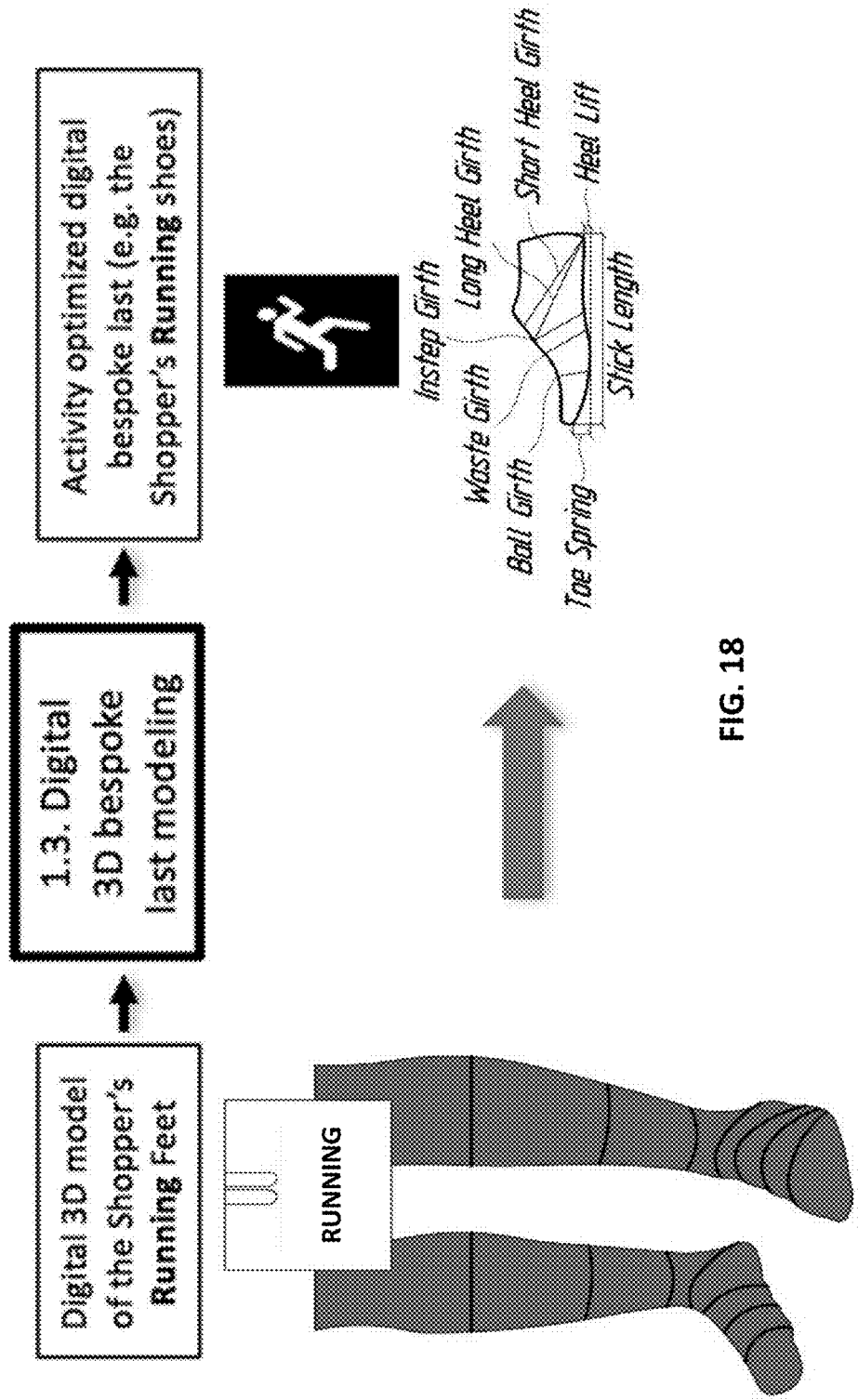

FIG. 18 illustrates digital 3D bespoke last modeling.

Figure 19:
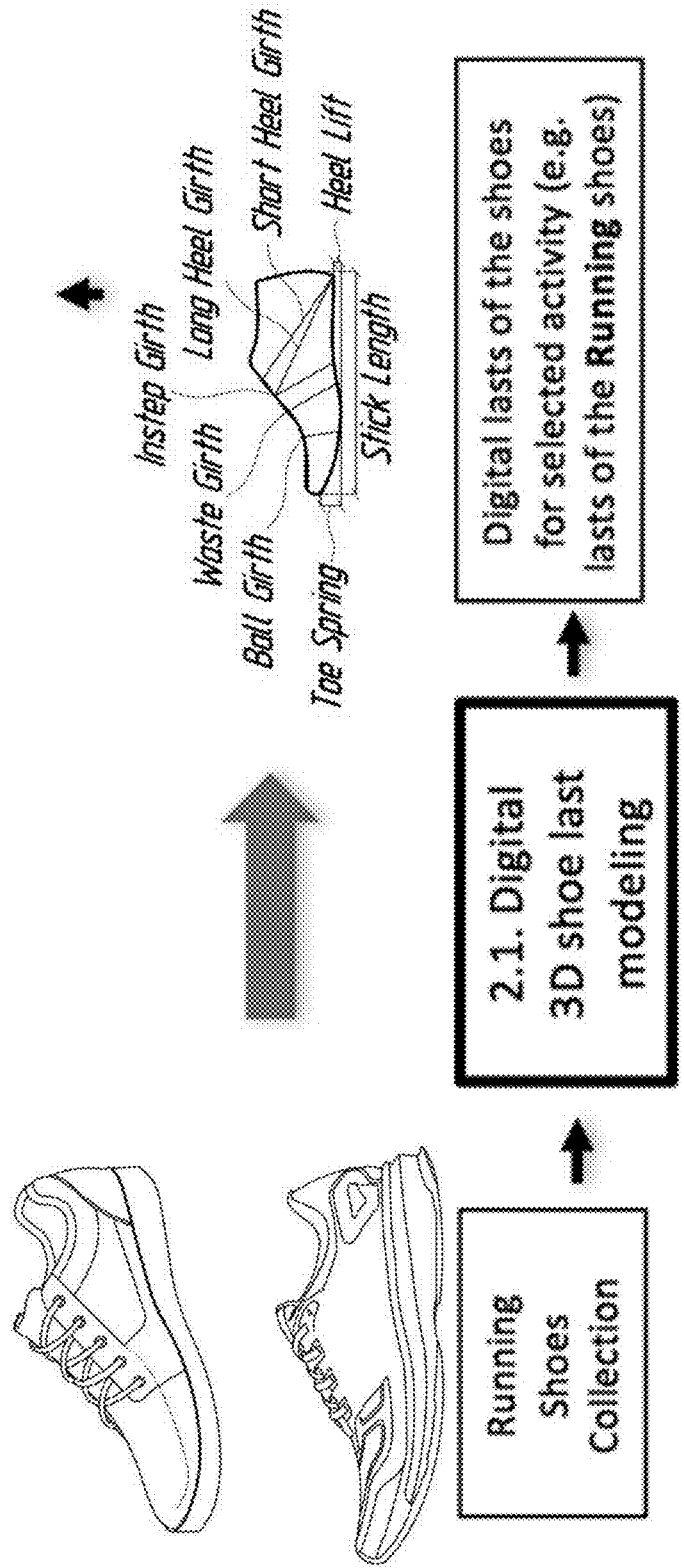

FIG. 19 shows activity-specific digital shoe last of the retailer's shoe collection.

Figure 20:
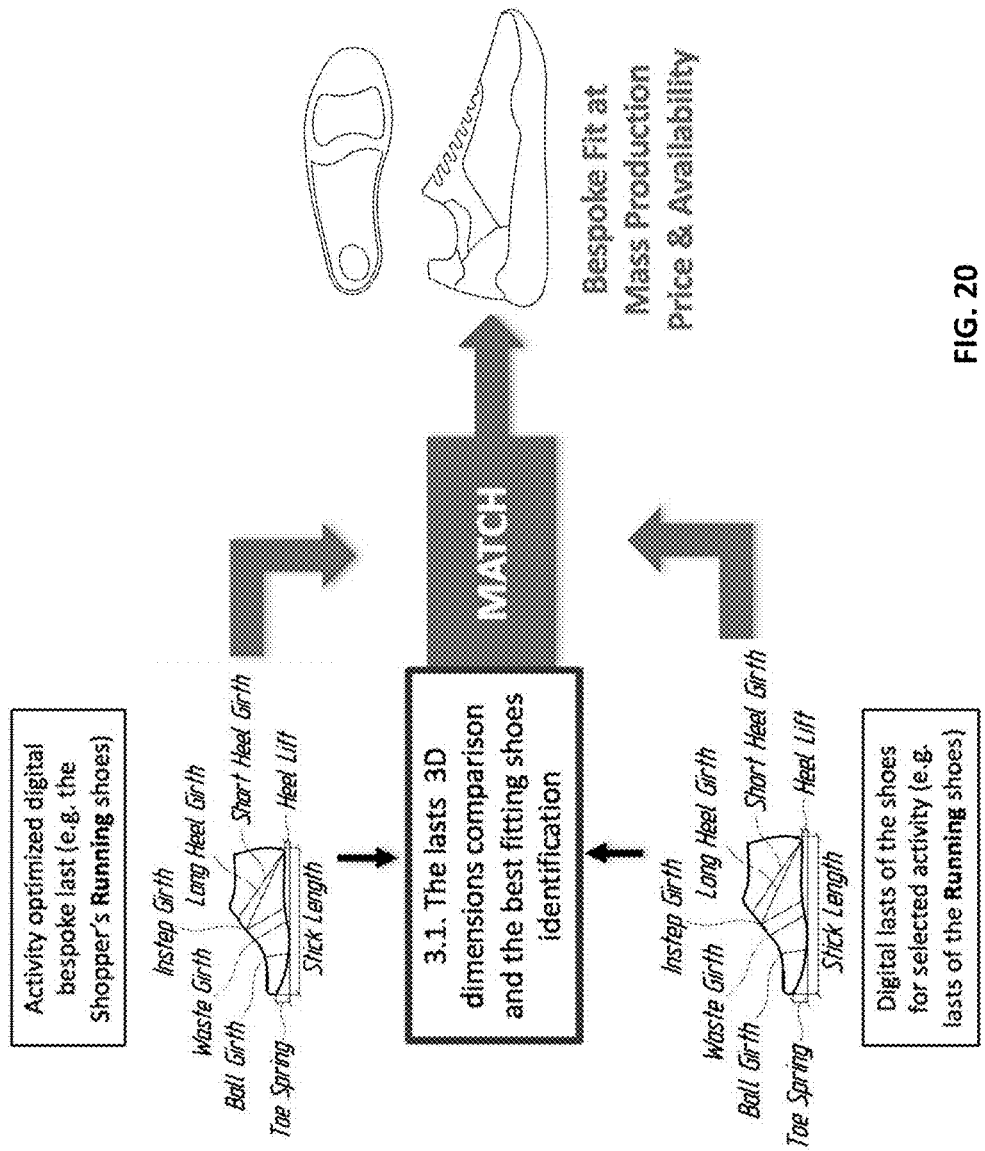

FIG. 20 shows bespoke and mass production shoe lasts 3D comparison and the best fitting shoe identification.

Figure 21:
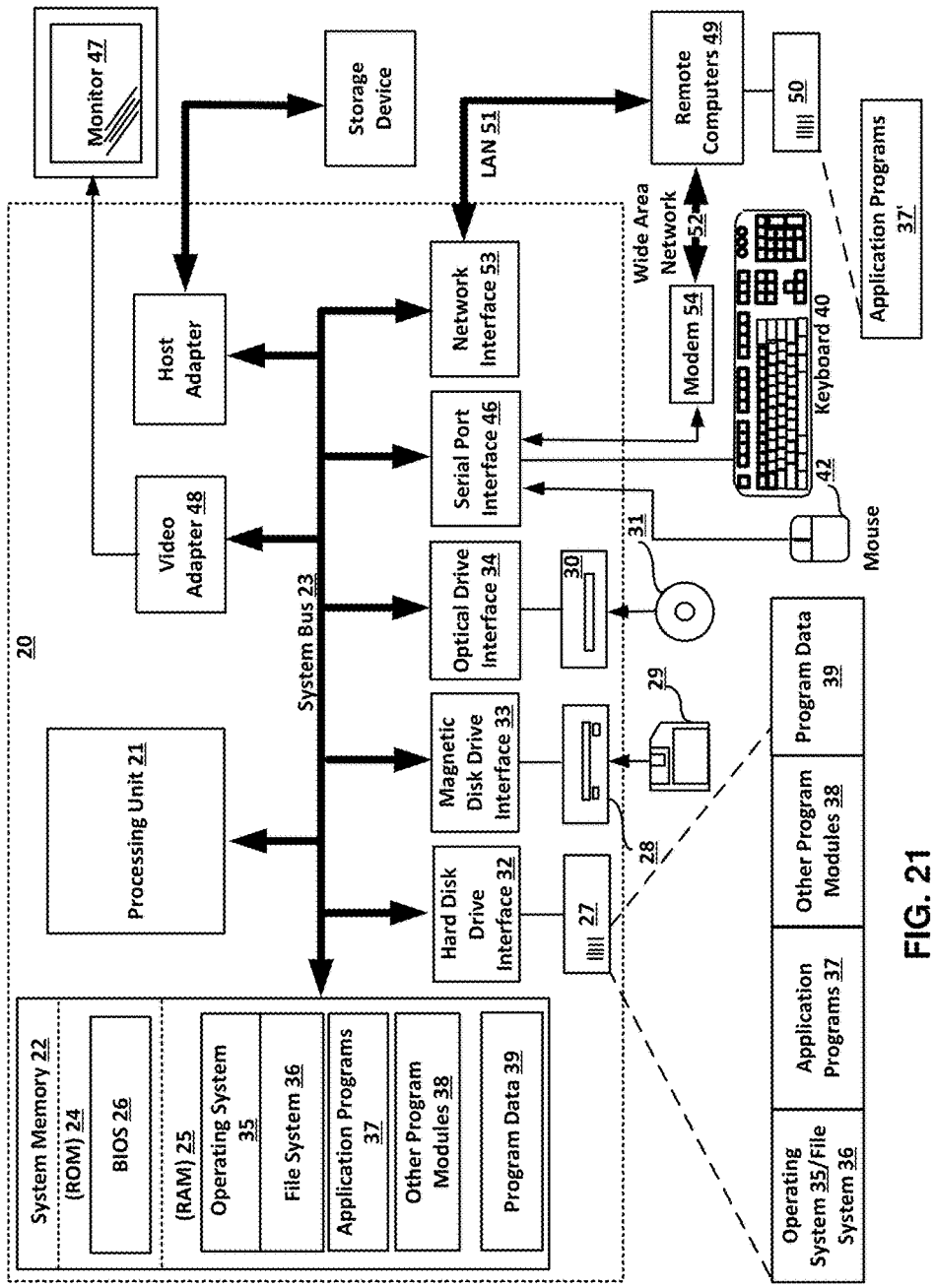

FIG. 21 shows an exemplary computer that may be used for implementing the invention.

DETAILED DESCRIPTION OF THE PREFERRED EMBODIMENTS

Reference will now be made in detail to the preferred embodiments of the present invention, examples of which are illustrated in the accompanying drawings.

The present invention is directed to a novel, non-obvious and useful process, which would automatically identify a bespoke level of fit optimized for a variety of shoe uses at mass production price and availability.

The process includes the following operations, as illustrated in FIG. 5A and FIG. 5B, which should be viewed as a single figure. In step 1.1 (additionally illustrated in FIG. 6), the feet are scanned and the foot is modeled in 3D in a standing posture. The shopper's feet in the standing posture get scanned either in a physical store using a stationary scanner or anywhere, anytime using the shopper's mobile device, such as a smartphone, tablets or other—using 2D photos, videos or 3D scans, for example by a structured sensor. The shopper's physical attributes could be added to the 3D digital model. This digital 3D model with extracted bespoke last type dimensions represents the feet in a standing posture. The 3D models of the shoppers' feet might be stored in the retailer's database.

Wearing the shoes create dynamic activity-specific interactions with the environment and the feet. Dynamic activities change the weight distribution, load the foot and, as a result, dynamically change 3D dimensions of the foot, creating collisions between the foot and the insides of the footwear. Therefore, this operation simulates a variety of shoe uses, such as walking, running hiking, skiing and other activities to construct 3D digital feet models optimized for those specific activities. The optimization may also include the shopper's motion mechanism, strike type, and other conditions (see FIG. 7). For example, as shown in FIG. 8, different types of running processes will be analyzed and simulated to create the most representative 3D foot models for different types of running. The same approach would be used for best match shoes identification for all other footwear activities, including the break-in shoe process for dress and high heel shoes (see FIG. 9).

FIG. 10 illustrates the block diagram of step 1.2, showing activity simulation and activity-based optimization of 3D foot modeling. FIG. 11 illustrates activity simulation and activity-based optimization of 3D foot modeling. The input to the algorithm is a 3D model of the foot, which corresponds to a scan of the foot of the user, and three primary measurements—foot length, foot width at ball, and foot width at bottom, see FIG. 12.

The 3D model of the user's foot is a cloud of points. The cloud is used to construct two characteristic ellipsoids, whose mutual position is used to define the locations of the toe, the heel and the shin, and to generate appropriate metadata, see FIG. 13 shows a possible configuration and position for the characteristic ellipsoids.

Then, based on the above metadata the scan of the foot is compared to the skinned mesh used in the animation, see FIG. 14.

Here, the animated skeleton and skinned mesh refer to components of the skeleton animation, see FIG. 15. The skinned mesh is a mesh, where each point has one or more vertex weight coefficients that represent a degree of dependence of the point on every skeletal bone.

At first, the animated skeleton and the skinned mesh of the foot, the length is scaled and then the space is transformed as follows (for the OY axis):

$$\varphi'(x, y, z) = \varphi\left(x, \left(\frac{(y2 - y1)(x - x1)}{yb(x2 - x1)} + \frac{y1}{yb}\right) \cdot (y - yc) + yc, z\right),$$

where $$yb = \left[\frac{B - A}{2}\right]_y, \text{ and } yc = \left[\frac{B + A}{2}\right]_y.$$

This means that when deforming along the axis OY with the base axis OX, the points of the space $R_3$ will linearly map to $R_3$ with an invariant straight line OX, and with the following relationships:

$$(p1_x, Y_b, z) \rightarrow (p1_x, p1_y, z),$$

$$(p2_x, Y_b, z) \rightarrow (p2_x, p2_y, z),$$

p1, p2 are the base points of the transformation, see FIG. 16. Specifically, the stop points p1 and p2 will be located where the width of the ball of the foot and the heel are measured. As a result of the transformation, a morphed animated skeleton and a morphed skinned foot mesh will be generated, which has the required dimensional parameters (length and width of the ball of the foot and the heel).

1. Then, by projecting the skinned mesh points on the surface of the user's scanned foot model, a skinned mesh is obtained, which corresponds to the maximum-deviation scan $$\sigma = \frac{L}{2}\sin\alpha,$$

where L is the maximum polygon size in any direction, α is the angle of maximum deviation between polygons of two meshes. For some of the models used, the maximum deviation is σ≈0.023 cm.

2. To the obtained model, a skeleton animation is applied, which was captured from a professional athlete performing some specific activity, e.g. running.

Figure 17A:
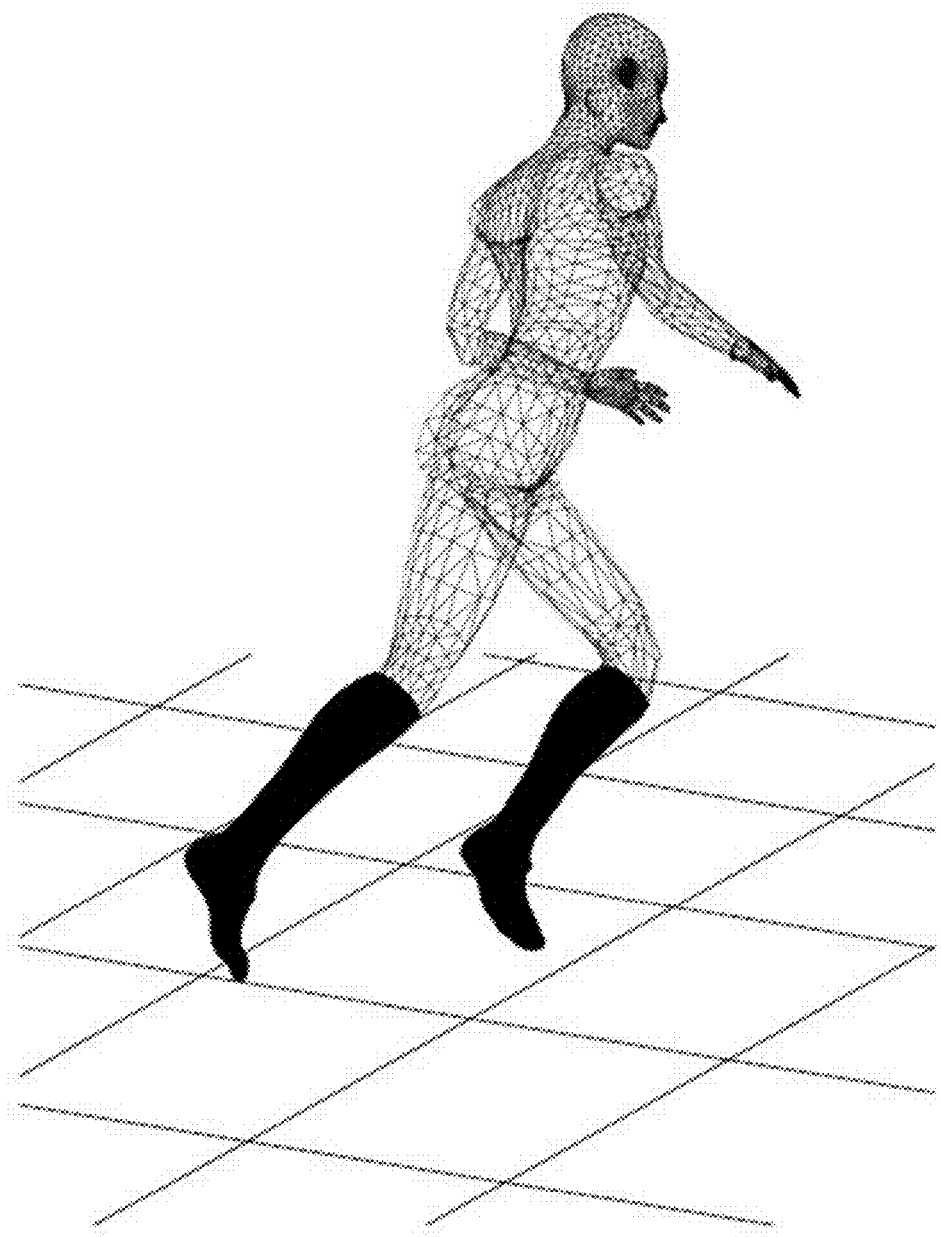
Figure 17B:
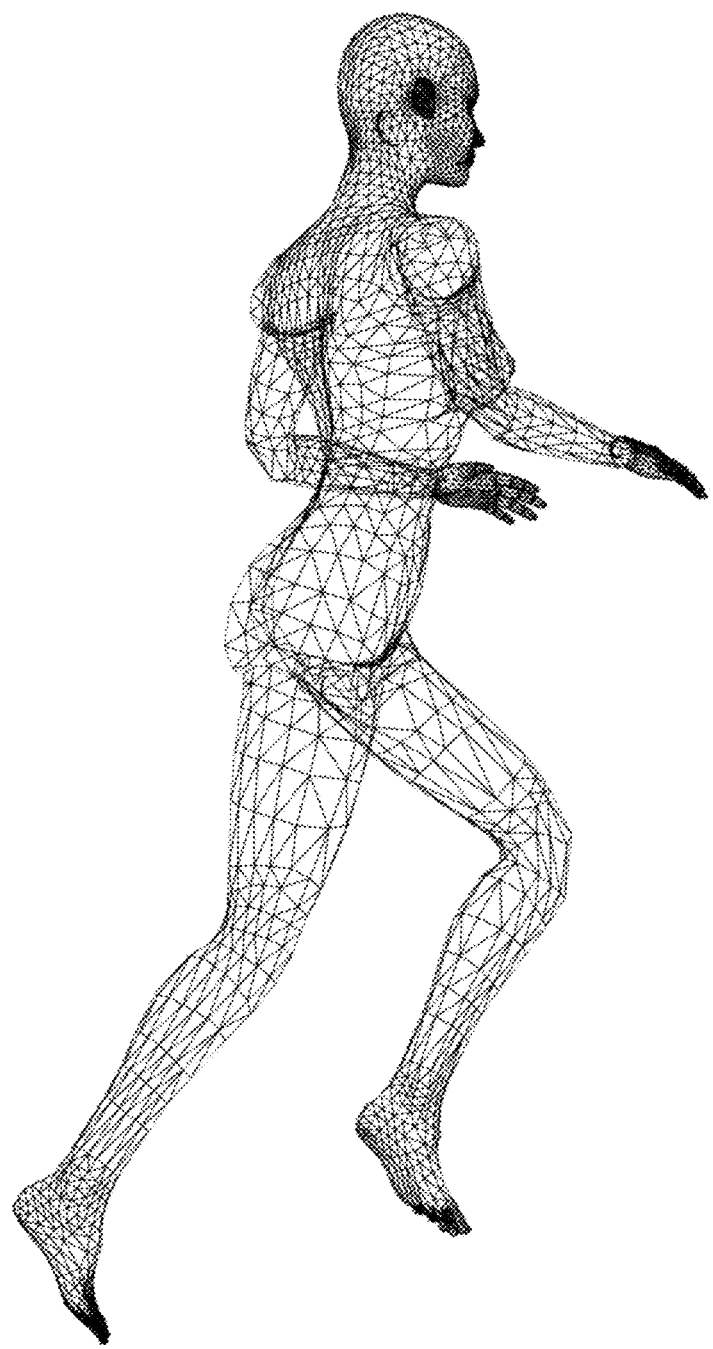
Figure 17C:
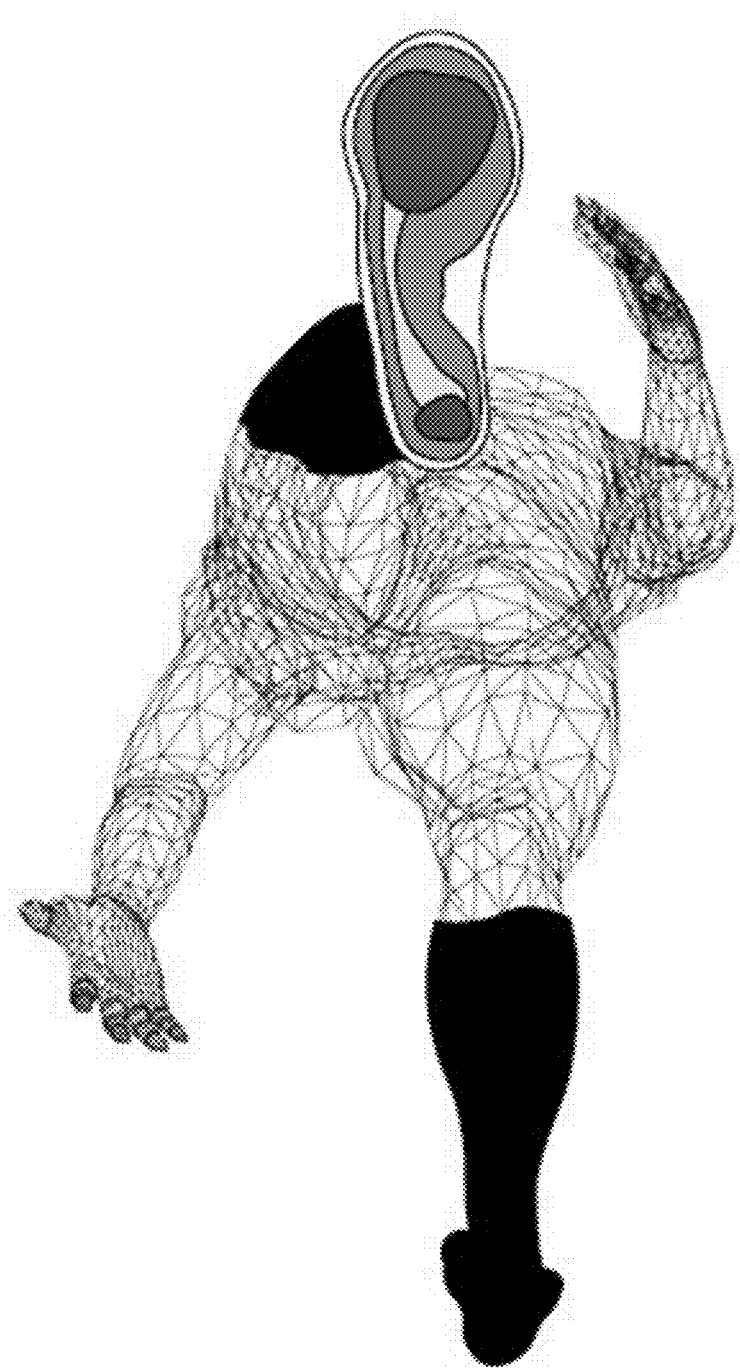
Figure 17D:
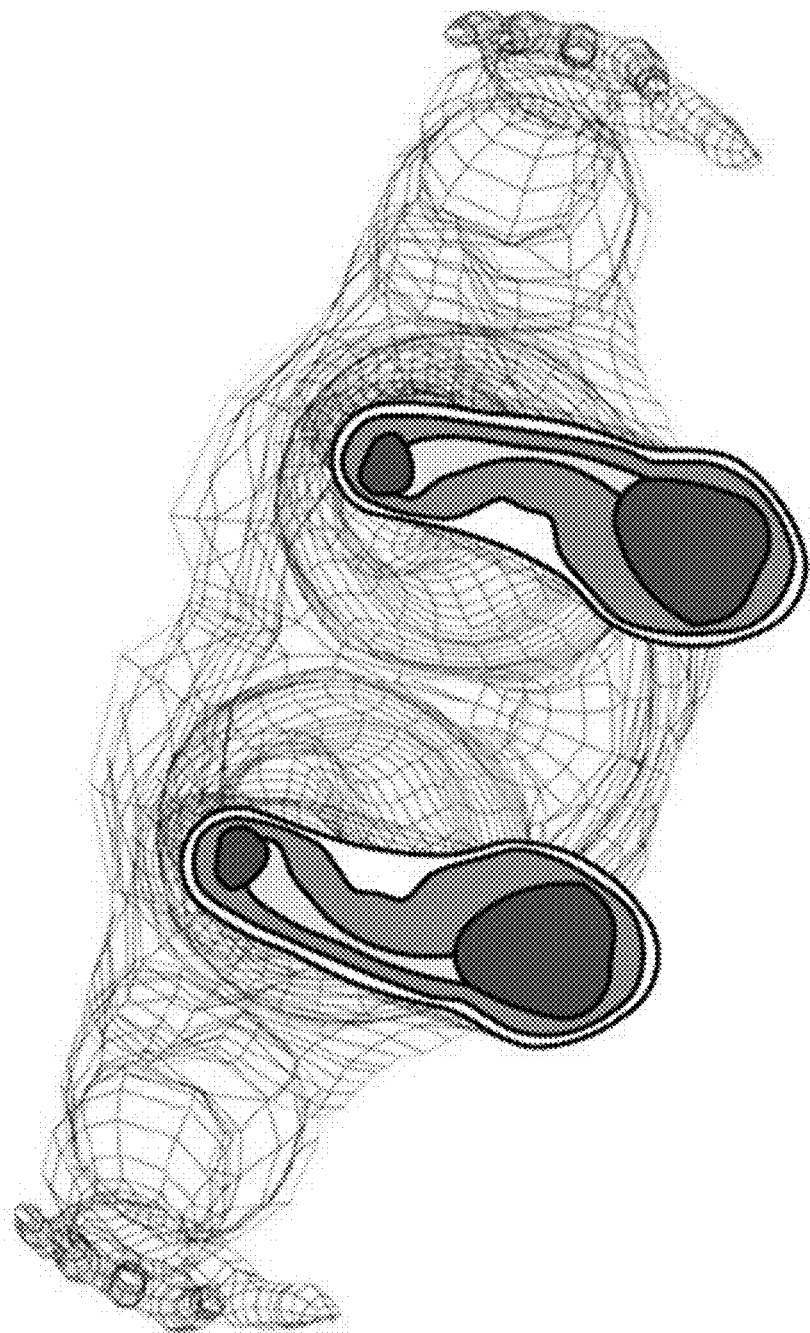

In each animation frame, see FIGS. 17A-17B, the positions of key points are monitored, soft-body deformations are applied to the mesh, which reflect a "squashing" or flattening of the foot during running, and pressure maps of foot impact against the ground are created. The graphs in FIGS. 17B and 17D reflect changes in foot dimensions at each moment in time. Peak deviations of the foot dimensions are returned in the algorithm output and then are used to generate a digital 3D model of the shopper's foot for specific activity, e.g. running.

Step 1.3 in FIG. 18 illustrates digital 2D bespoke last modeling. This operation extracts bespoke-type dimensions from the shopper's 3D Digital Feet Models optimized for a variety of shoe uses and creates their bespoke digital lasts, e.g. activity-optimized last for the Shopper's running shoes. Bespoke lasts for different activities could be stored in the database.

FIG. 18 shows activity-optimized digital last construction. This operation creates digital shoe lasts of the retailer's shoe collection. It uses either the brand's digital lasts (a) or scans of the brand's physical lasts (b) or if they are not available, scans of the insides of the shoes made by any scanners (c).

FIG. 19 shows activity-specific digital shoe last of the retailer's shoe collection.

Step 3.1 in FIG. 20 illustrates bespoke and mass production shoe lasts 3D comparison and the best fitting shoe identification. This final operation compares the bespoke digital 3D last constructed for the shopper's digital 3D foot model optimized for a specific activity (e.g., running) with activity-specific shoe lasts of the retailer's shoe collection. Traditional, well substantiated and verified, bespoke foot and last dimensions (FIG. 20) could be used for comparison and identification of the best fitting footwear.

With reference to FIG. 21, an exemplary system for implementing the invention includes a general purpose computing device in the form of a host computer or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for determining best fitting footwear, the method comprising:
    acquiring, from a scanner, a static 3D scan of a user's feet in a static standing posture;
    generating a static 3D model of the user's feet based on the static 3D scan;
    modifying the static 3D model to generate a dynamic 3D model that simulates a changed shape of the user's feet when performing an athletic activity, including a simulation of a flattening of the user's feet during exercise and a simulation of peak dimensions of the user's feet during the exercise by scaling a length of each foot according to $$\varphi'(x, y, z) = \varphi\left(x, \left(\frac{(y2 - y1)(x - x1)}{yb(x2 - x1)} + \frac{y1}{yb}\right) \cdot (y - yc) + yc, z\right),$$

where $$yb = \left[\frac{B - A}{2}\right]_y, \text{ and } yc = \left[\frac{B + A}{2}\right]_y,$$

A is desired heel width,
B is desired ball width,
y1 is current heel width,
y2 is current ball width,
x1 is location of the heel on the static 3D model,
x2 is location of the ball on the static 3D model,
φ' is a spatial transformation of φ;
identifying a shoe last that matches the dynamic 3D model; and
informing the user about which footwear has a shoe last that matches the identified shoe last,
wherein the static 3D model and the dynamic 3D model use a set of polygons to form a skin mesh of a surface being modeled.

2. The method of claim 1, wherein the static 3D scan is retrieved from a database.

3. The method of claim 1, wherein the static 3D scan is generated on the fly.

4. The method of claim 1, wherein the static 3D scan is generated based on images from a mobile device.

5. The method of claim 1, wherein the dynamic 3D model takes into account a type of athletic activity.

6. The method of claim 1, wherein the dynamic 3D model takes into account a weight distribution on the feet of the user.

7. The method of claim 1, wherein the dynamic 3D model takes into account a load on the feet of the user.

8. The method of claim 1, wherein the dynamic 3D model takes into account a motion mechanism and strike type.

9. The method of claim 1, wherein the dynamic 3D model modifies a foot length, a foot width at ball of the foot, and a foot width at bottom of the foot.

10. The method of claim 1, wherein the dynamic 3D model modifies any of measurements of lengths of imaginary lines drawn on the user's foot.

11. The method of claim 1, wherein the static 3D model includes two characteristic ellipsoids, whose mutual position is used to define the locations of a toe, a heel and a shin.

12. The method of claim 1, wherein the dynamic 3D model includes a maximum-deviation scan $$\sigma = \frac{L}{2}\sin\alpha,$$

where L is a maximum polygon size in any direction, and α is an angle of maximum deviation between the polygons of the skin mesh.

13. The method of claim 1, further comprising applying soft-body deformations are applied to the skin mesh of the static 3D model, which reflect a flattening of the foot.

14. The method of claim 1, further comprising calculating a fit of the dynamic 3D to the footwear using a combination of weighted comparison parameters.

15. The method of claim 1, wherein the step of identifying a footwear includes matching an internal 3D model of the footwear.

16. A system for determining best fitting footwear, the system comprising:
a computing device configured to acquire or generate a static 3D scan of a user's feet in a static standing posture;
the computing device configured to modify the static 3D model to generate a dynamic 3D model, based on the static 3D scan, that corresponds to changed shape of the user's feet when performing an athletic activity, the dynamic 3D model including a simulation of a flattening of the user's feet during exercise and a simulation of peak dimensions of the user's feet during the exercise by scaling a length of each foot according to $$\varphi'(x, y, z) = \varphi\left(x, \left(\frac{(y2 - y1)(x - x1)}{yb(x2 - x1)} + \frac{y1}{yb}\right) \cdot (y - yc) + yc, z\right),$$

where $$yb = \left[\frac{B - A}{2}\right]_y, \text{ and } yc = \left[\frac{B + A}{2}\right]_y,$$

A is desired heel width,
B is desired ball width,
y1 is current heel width,
y2 is current ball width,
x1 is location of the heel on the static 3D model,
x2 is location of the ball on the static 3D model,
φ' is a spatial transformation of φ,
wherein the static 3D model and the dynamic 3D model use a set of polygons to form a skin mesh of a surface being modeled;
the computing device configured to identify a shoe last that matches the dynamic 3D model; and
the computing device configured to inform the user of which footwear has a shoe last that matches the identified shoe last.

17. A method for determining best fitting footwear, the method comprising:
acquiring a 3D scan of a user's feet in a static standing posture;
based on the 3D scan, generating a digital 3D model of the user's feet in the static standing posture,
wherein the static 3D model and the dynamic 3D model use a set of polygons to form a skin mesh of a surface being modeled,
the dynamic 3D model including a simulation of a flattening of the user's feet during exercise and a simulation of peak dimensions of the user's feet during the exercise by scaling a length of each foot according to $$\varphi'(x, y, z) = \varphi\left(x, \left(\frac{(y2 - y1)(x - x1)}{yb(x2 - x1)} + \frac{y1}{yb}\right) \cdot (y - yc) + yc, z\right),$$

where $$yb = \left[\frac{B - A}{2}\right]_y, \text{ and } yc = \left[\frac{B + A}{2}\right]_y,$$

A is desired heel width,
B is desired ball width,
y1 is current heel width,
y2 is current ball width,
x1 is location of the heel on the static 3D model,
x2 is location of the ball on the static 3D model,
φ' is a spatial transformation of φ;

generating a bespoke digital 3D shoe last for the digital 3D model;
generating a bespoke activity-optimized digital 3D shoe last for the digital 3D model;
generating digital 3D shoe lasts for a footwear collection;
comparing the bespoke activity-optimized digital 3D shoe last and the digital 3D shoe lasts for the footwear collection to identify a match in the footwear collection; and
informing the user of the match.

18. A method for determining best fitting footwear, the method comprising:
acquiring a static 3D scan of a user's feet in a standing posture;
generating a static 3D model of the user's feet based on the static 3D scan;
modifying the static 3D model to generate a dynamic 3D model that corresponds to changed shape of the user's feet when performing an athletic activity,
wherein the static 3D model and the dynamic 3D model use a set of polygons to form a skin mesh of a surface being modeled,
the dynamic 3D model including a simulation of a flattening of the user's feet during exercise and a simulation of peak dimensions of the user's feet during the exercise,
wherein the modifying includes scaling the foot length according to $$\varphi'(x, y, z) = \varphi\left(x, \left(\frac{(y2-y1)(x-x1)}{yb(x2-x1)} + \frac{y1}{yb}\right) \cdot (y - yc) + yc, z\right),$$

where $$yb = \left[\frac{B-A}{2}\right]_y, \text{ and } yc = \left[\frac{B+A}{2}\right]_y,$$

A is desired heel width,
B is desired ball width,
y1 is current heel width,
y2 is current ball width,
x1 is location of the heel on the static 3D model,
x2 is location of the ball on the static 3D model,
φ' is a spatial transformation of φ,
wherein the static 3D model includes two characteristic ellipsoids, whose mutual position is used to define the locations of a toe, a heel and a shin, and
wherein the dynamic 3D model includes a maximum-deviation scan $$\sigma = \frac{L}{2}\sin\alpha,$$

where L is a maximum polygon size in any direction, a is an angle of maximum deviation between polygons of the skin mesh;
identifying a match for a shoe last based on the modified 3D model; and
informing the user about which footwear has a shoe last that matches the identified shoe last.

* * * * *